United States Patent [19]

Kawabata

[11] Patent Number: 4,472,040

[45] Date of Patent: Sep. 18, 1984

[54] AUTOMATIC FOCUSING CAMERA

[75] Inventor: Takashi Kawabata, Kamakura, Japan

[73] Assignee: Canon Kabushiki Kaisha, Tokyo, Japan

[21] Appl. No.: 442,576

[22] Filed: Nov. 18, 1982

[30] Foreign Application Priority Data

Nov. 20, 1981 [JP] Japan .................................. 56-187306

[51] Int. Cl.³ .............................................. G03B 3/10
[52] U.S. Cl. ................................................... 354/406
[58] Field of Search ..................... 354/25, 195, 286; 352/140

[56] References Cited

U.S. PATENT DOCUMENTS 4,341,953  7/1982  Sakai et al. ...................... 354/25 X
4,344,679  8/1982  Yagi et al. ............................. 354/25
4,400,075  8/1983  Tomori et al. ................... 354/286 X Primary Examiner—Michael L. Gellner
Attorney, Agent, or Firm—Fitzpatrick, Cella, Harper & Scinto

[57] ABSTRACT

This invention relates to a camera capable of automatic focusing by displacing a focusing lens in an interchangeable lens in accordance with a focusing signal obtained from focus detecting elements for receiving the light passing through said interchangeable lens, and provides a device capable of maintaining a constant driving force per unit time for said focusing lens even when the moving characteristics of the focusing lens varies among different interchangeable lenses.

6 Claims, 6 Drawing Figures

AUTOMATIC FOCUSING CAMERA

BACKGROUND OF THE INVENTION

1. Field of the Invention

The present invention relates to a through-the-lens automatic focusing system, and more particularly to a control process for use in such system for driving a focusing lens in an interchangeable lens system.

2. Description of the Prior Art

There are already proposed various focusing control methods for automatic focusing devices for use in single-lens reflex cameras, and one of such methods relies on the detection of sharpness of an object image to control the focus position of an optical system in response to output signals from plural photoelectric converting elements for receiving the light passing through a focusing lens in an interchangeable lens. Such method is disclosed in the U.S. patent application Ser. No. 150,958 filed on May 19, 1980, of which inventors include the present inventor. This application was abandoned in favor of continuation application Ser. No. 3,330,438 filed on Dec. 14, 1981, now U.S. Pat. No. 4,443,086.

Automatic focusing system utilizing the abovementioned method provides advantages of a higher focusing speed and an accurate focusing operation even for an object under a relatively dark condition, in comparison with other conventional methods.

The above-mentioned method, however, does not provide perfect solution to the problems related to the use of various interchangeable lenses. The interchangeable lenses include various lenses such as a standard lens containing a movable focusing lens and a fixed imaging lens, a zoom lens containing a movable focusing lens and a movable magnification-changing lens, a zoom lens including a macro-photographic mechanism for enabling close-up photographing, etc. In most of such lenses, a focusing lens is rendered axially movable by a helicoid or cam mechanism in a lens barrel for focusing onto an object.

In such various interchangeable lenses, the driving force required for the motor for axially driving the focusing lens varies, depending on the loads of the helicoid or cam mechanisms.

Consequently, in case of driving the focusing lens by a motor according to the above-mentioned focusing method, differences in the driving characteristics resulting from the differences in the above-mentioned loads of interchangeable lenses give rise to fluctations in the focusing accuracy and/or in the focusing time, even when the same motor driving signal calculated according to the above-mentioned method is supplied to the motor driving circuit.

Also the output signal from the motor driving circuit in the camera is generally weak and is often unable to smoothly move the focusing lens because of the fluctations in the load thereof, thus giving blurred image.

SUMMARY OF THE INVENTION

In view of the above-described problems, the present invention has a first object of providing a camera with an automatic focusing system, in which a determined driving energy is supplied to a focusing lens driving means, such as a motor, for the same amount of de-focus detected by the focus detecting or distance detecting means (hereinafter simply called "focus detecting means"), regardless of fluctuations in the moving characteristics, such as the loads of the focusing lenses, of the interchangeable lenses.

The present invention has a second object of providing an interchangeable lens adapted for use with the camera with the automatic focusing system satisfying the above-mentioned first object, and, more particularly, adapted to supply an electric signal corresponding to the moving characteristics of the lens to the motor driving circuit for driving the focusing lens in response to a focusing signal from the focus detecting means, whereby the energy to be supplied to the motor is constant for the same amount of de-focus, regardless of the type of the interchangeable lens used.

The present invention also has a third object of providing an automatic focusing camera capable of rapid focusing operation of the focusing lens. According to an embodiment of the present invention, at least two focus detecting elements for receiving the light passing through the focusing lens are disposed respectively, in front of and behind a predetermined focal plane, and a power supply signal to the lens driving motor is detected in accordance with outputs from the focus detecting elements so that the power supply signal is generated for a determined period for focusing operation when the focusing lens is positioned within a predetermined de-focus range, while the power supply signal is generated continuously when the focusing lens is positioned outside said predetermined range, to bring said focusing lens into said range, thereby substantially shortening the time required for the focusing operation.

DESCRIPTION OF THE PREFERRED EMBODIMENTS

Figure 1:
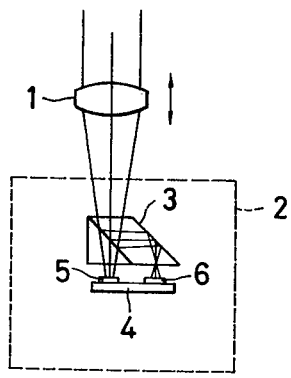
FIG. 1 is a schematic view showing optical arrangement of a sensor block constituting a focus detecting system employed in a conventional system.

At first, there will be given an explanation on a focus detecting system employed in the present invention. Referring to FIG. 1 there are shown a photographing lens 1 movable along the optical axis thereof; and a focus detecting sensor block 2 provided therein with a beam-splitting prism 3 for directing an image in front of or behind a predetermined focal plane (plane of a photographic film) to a photoelectric converting element 5 or 6.

Figure 2:
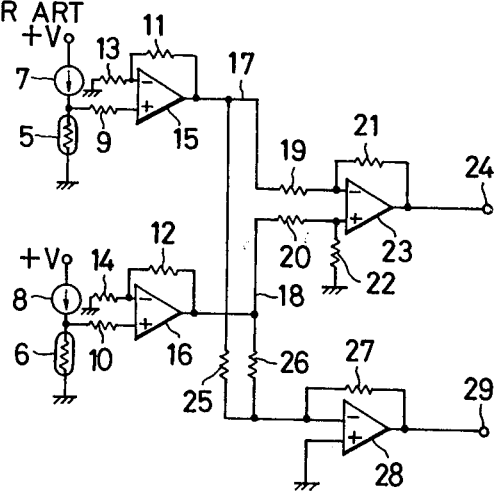
FIG. 2 is a partial circuit diagram showing an embodiment of a focus detecting circuit of the above-mentioned focus detecting system.

Referring to FIG. 2, a circuit composed of components 9–29 constitute focusing signal generating means which generates a first signal representing the amount of de-focus, within a predetermined range, corresponding to the positional relationship between a focusing lens of the interchangeable lens and the above-mentioned focus detecting elements 5, 6, and a second signal indicating that the focusing lens is positioned outside the above predetermined de-focus range.

As shown in FIG. 2, each of the above-mentioned photoelectric converting elements 5, 6, powered by constant-current sources 7, 8, generates a voltage at the terminal thereof corresponding to the sharpness of the image in front of or behind the predetermined focal plane, and these voltages are converted at output terminals 17, 18 into amplified sharpness signals through amplifying circuits composed of input resistors 9, 10, feedback resistors 11, 12, dividing resistors 13, 14 and operational amplifiers 15, 16. Said signals are supplied to a differential amplifier composed of input resistors 19, 20, feedback dividing resistors 21, 22 and an operational amplifier 23 to obtain, at an output terminal 24 thereof, a signal representing the difference (or ratio) of the degrees of the image sharpness in front of and behind the predetermined focal plane.

Said signals are also supplied to an adding amplifier composed of adding resistors 25, 26, a feedback resistor 27 and an operational amplifier 28 to obtain, at an output terminal 29 thereof, a signal representing the sum (or product) of the degrees of the image sharpness in front and behind the predetermined focal plane.

Figure 3:
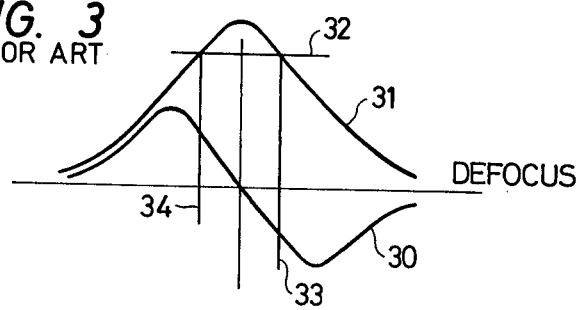
FIG. 3 is a chart showing changes of output signal from the circuit, shown in FIG. 2, in response to the focusing operation.

FIG. 3 shows such two signals representing, respectively, said difference (or ratio) and said sum (or product), relative to the amount of de-focus, i.e. the distance between the focal plane of the lens and the predetermined focal plane. The abscissa represents the amount of de-focus while the ordinate represents the signal level.

As can be seen from FIG. 3, said difference or ratio signal at the output terminal 24, shown by a curve 30, assumes an S-shaped form, being equal to zero at zero de-focus and becoming positive or negative according to the sign of the de-focus, while said sum or product signal at the output terminal 29, shown by a curve 31, assumes a symmetrical form, becoming largest at zero de-focus and approaching zero as the de-focus increases. It is known that the difference or ratio signal, shown by the curve 30, is stable and changes linearly where the sum or product signal shown by the curve 31 is high, for example higher than a level 32, i.e. within a de-focus range defined by limits 33 and 34.

Apart from the above-described focus detecting system utilizing sharpness, another system utilizing so-called image deviation is known to provide similar signals, i.e. a signal behaving like the curve 31 and representing the maximum degree of correlation and another signal behaving like the curve 30 and representing the degree of image deviation.

Figure 4:
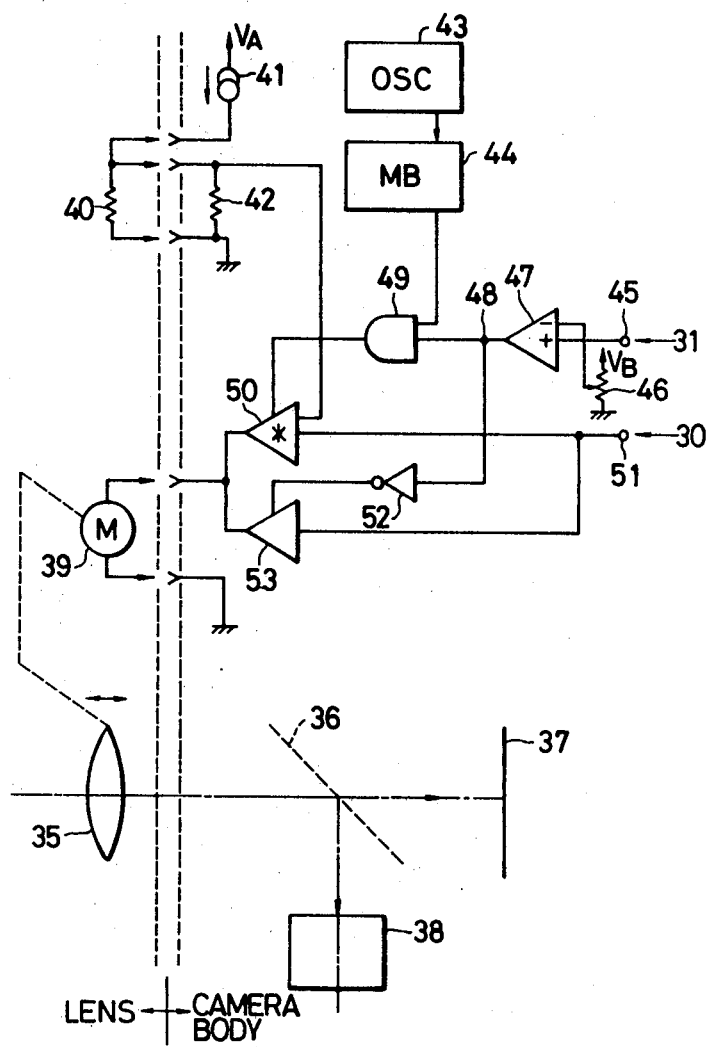
FIGS. 4 and 5 are block diagrams showing the circuit structures to be employed, in two embodiments of the present invention, in combination with the circuit shown in FIG. 2.

FIG. 4 shows an embodiment of the present invention wherein an interchangeable lens and a camera body are respectively shown at the left-hand and right-hand sides. In FIG. 4 there are shown a photographing lens 35 movable along the optical axis thereof, a half mirror 36 for directing the image forming light toward a focus detecting system 38, a photographic film plane 37 constituting the predetermined focal plane, and a motor 39 for driving said photographing lens 35 under control from the camera body. VA and VB indicate predetermined voltages. A resistor member 40, provided on the interchangeable lens, constitutes signal input means in combination with a constant current source 41 and a resistor 42 provided in the camera body. Said resistor member 40 has a resistance corresponding to the species of the interchangeable lens, i.e. to the magnitude of the load of helicoid or cam mechanism for the focusing lens, and generates a voltage corresponding to the energy required for a motor driving circuit to generate a signal realizing a constant movement per unit time. Resistors 40 and 42 are connected parallel in order to avoid signal generation from the output terminal on the camera body when the interchangeable lens is dismounted from the camera body.

An oscillator 43 generates pulses of a determined frequency, in response to which a multivibrator 44 generates pulses of a determined duty ratio.

The aforementioned sum or product signal 31 supplied from the output terminal 29 of the amplifier 28 shown in FIG. 2 is supplied to a terminal 45 and is compared in a comparator 47 with a reference voltage supplied from a voltage divider 46. Said comparator 47 generates a high-level signal in case said signal 31 is sufficiently high i.e. within the limits 33 and 34 shown in FIG. 3, or otherwise a low-level signal, from an output terminal 48.

The above-mentioned voltage divider 46 and comparator 47 constitute a discriminating circuit for discriminating whether the focusing lens 35 is positioned inside the predetermined de-focus range, i.e. within the limits 33 and 34 shown in FIG. 3. The output level of the voltage divider 46 corresponds to the threshold level 32 shown in FIG. 3.

In case the level of the signal 31 from the focusing signal generating means shown in FIG. 2 is higher than said threshold level, namely in case the focusing lens 35 is positioned inside the predetermined de-focus range shown in FIG. 3, the output signals from the comparator 47 and from the multivibrator 44 are supplied to a logic adding circuit 49, the output signal of which is supplied to a multiplier 50 generating periodic output signals.

Said output signal from the multiplier 50 represents the product of the signal from the aforementioned signal input means and of the difference or ratio signal, corresponding to the amount of de-focus, supplied to a terminal 51 from the output terminal 24 of the amplifier 23 shown in FIG. 2. Said product corresponds to the estimated amount of driving, and the motor 39 is accordingly driven to focus the lens 35.

On the other hand, in case the level of the sum or product signal 31 supplied to the terminal 45 is low, the comparator 47 provides a low-level signal to release a high-level signal from a converter 52, whereby an amplifier 53 effects servo control of the motor 39 in response to the difference or ratio signal 30 supplied to the terminal 51, thereby focusing lens 35. In this manner, the focusing of the lens 35 is achieved by the multiplier 50 when the level of the sum or product signal 31 supplied to the terminal 45, or otherwise by the servo control through the amplifier 53.

Figure 6:
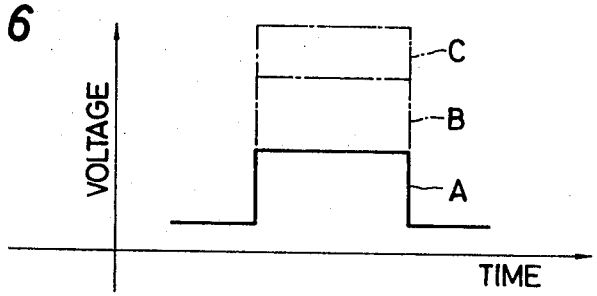
FIG. 6 is a chart showing changes of output signal from a multiplier 50 as a function of the value of resistance in the interchangeable lens, representing the motor energizing time and the supplied voltage respectively in the ordinate and in the abscissa.

As explained before, the signal supplied from the signal input means 40, 41 to the multiplier 50 includes correcting information corresponding to the moving characteristic of the focusing lens in the interchangeable lens. More specifically, when the focusing lens is positioned inside the predetermined de-focus range shown in FIG. 3, said adding circuit 49 releases a signal represented by a full line in FIG. 6, while the signal input means including the resistor 40 on the interchangeable lens supplies a signal or a voltage indicating the type of said lens, and both signals are processed in the multiplier 50 to generate a signal represented by a chain line or a double-dotted chain line. The energy supplied to the motor is changed as A, B or C according to the information from the resistor 40 on the interchangeable lens.

Figure 5:
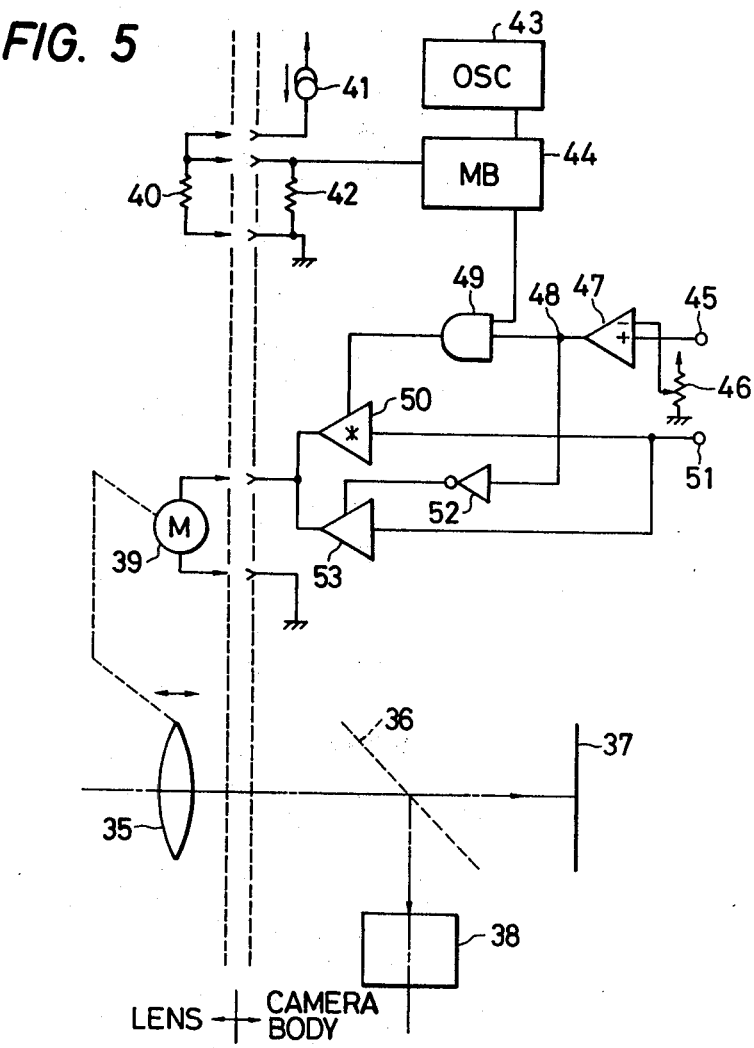

FIG. 5 shows another embodiment of the present invention, in which the output signal from the resistor 42 is supplied to the multivibrator 44 to generate pulses of a duty ratio correspondig to said output signal, whereby the motor 39 is given a driving force representing the product of the output level of said resistor 42 and of the duty ratio of the amplifier 44 instead of the multiplier.

It will be understood that, in the foregoing embodiments, the resistor 40 on the interchangeable lens may be so constructed as to generate a digital input signal instead of an analog signal, and the motor 39 may be composed of a stepping motor, in which case the output signal of the amplifier is converted into corresponding pulses.

Also, instead of generating a signal indicating the required driving force from the interchangeable lens, it is possible to make approximate selection, for example for wide-angle, standard, short telephoto and long telephoto lenses, with a selector switch in the camera body.

Furthermore, the resistor 40 may be composed of a variable resistor in case the driving force for the unit distance of focus plane movement varies, for example in a zoom lens or a rear focus lens.

As explained in the foregoing, the present invention enables easy and rapid automatic focusing by generating a driving force corresponding to the interchangeable lens used, and is particularly adapted for use in an automatic focusing camera with interchangeable lenses, such as a single-reflex camera.

Also the present invention permits completion of the focusing operation within a shortened time by constituting the motor driving circuit from a first control circuit utilizing the output signal from the aforementioned multiplier 50 and a second control circuit utilizing the output signal from the inverter 52 and the amplifier 53, and selectively controlling the power supply to the motor according to the amount of de-focus of the focusing lens.

Furthermore, the present invention, so constructed to provide a signal for generating a predetermined driving force according to the type of the interchangeable lens used, permits development of driving energy exactly corresponding to the lens, while preventing fluctuations in the motor torque resulting from the variation in the driving load of the interchangeable lens, thereby allowing correct focusing operation without blur in the object image.

What I claim is:
1. An automatic focusing camera comprising:
    a focusing lens for forming an image of an object;
    focusing signal generating means having a focus detecting element for receiving the light, reflected from said object, and putting out a focusing signal in accordance with a signal from said focus detecting element;
    signal input means for supplying a signal corresponding to the moving characteristic of said focusing lens;
    driving means for driving said focusing lens; and
    a circuit for controlling said driving means;
    said circuit having a multiplier for multiplying the signal from said focusing signal generating means by the signal from said signal input means and generating a signal for driving said motor so as to maintain a constant amount of movement of said focusing lens per unit time, regardless of the moving characteristic of said focusing lens.

2. An automatic focusing camera according to claim 1, further comprising an interchangeable lens mountable on said camera, wherein said signal input means comprises an electric resistor provided in said interchangeable lens, said electric resistor being adapted to generate a signal corresponding to the moving characteristic of said focusing lens in said interchangeable lens.

3. An automatic focusing camera comprising:
    at least two focus detecting elements positioned respectively in front of and behind a plane equivalent to a predetermined focal plane and receiving the light passing through a focusing lens;
    focusing signal generating means for generating a first signal representing the amount of de-focus within a predetermined range or a second signal representing that said focusing lens is out of said predetermined de-focus range, according to the positional relationship between said focus detecting elements and said focusing lens;
    discriminating means adapted for discriminating whether said focusing lens is positioned within said predetermined de-focus range and generating a discrimination signal;
    a driving circuit for controlling the power supply to a motor for driving said focusing lens, said circuit including:
        a first control circuit for activating said motor for a predetermined period in response to said first signal from said focusing signal generating means, when said focusing lens is positioned within said predetermined de-focus range; and a second control circuit for continuously activating said motor to move said focusing lens into said predetermined de-focus range in response to said second signal from said focusing signal generating means when said focusing lens is positioned out of said predetermined de-focus range.

4. An automatic focusing camera according to claim 3, wherein said first control circuit includes:
    a circuit for generating pulses of a predetermined frequency; and
    a time determining circuit for determining the activating time of said motor in response to the discriminating signal from said discriminating circuit and the signals from said pulse generating circuit.

5. An automatic focusing camera according to claim 4, wherein said time determining circuit in the first control circuit is composed of a logic adding circuit.

6. An interchangeable lens mountable on an automatic focusing camera having a focus detecting element for receiving the light passing through a focusing lens, focusing signal generating means for generating a focusing signal in accordance with the signal from said focus detecting element, discriminating means for discriminating whether said focusing lens is positioned within a predetermined de-focus range, and a motor driving circuit for activating a motor for driving said focusing lens for a predetermined period when said focusing lens is positioned within said predetermined de-focus range, said interchangeable lens comprising:
    signal output means for putting out an electric signal corresponding to the moving characteristic of said focusing lens in said interchangeable lens to control activation of said motor so that, when said motor is driven for a predetermined period in response to the signal from said motor driving circuit, said motor generates a constant driving force per unit time.

* * * * *